Nov. 15, 1966 R. C. HOWELL ETAL 3,285,438
PARTICLE STORAGE BIN
Filed Sept. 11, 1964 3 Sheets-Sheet 1
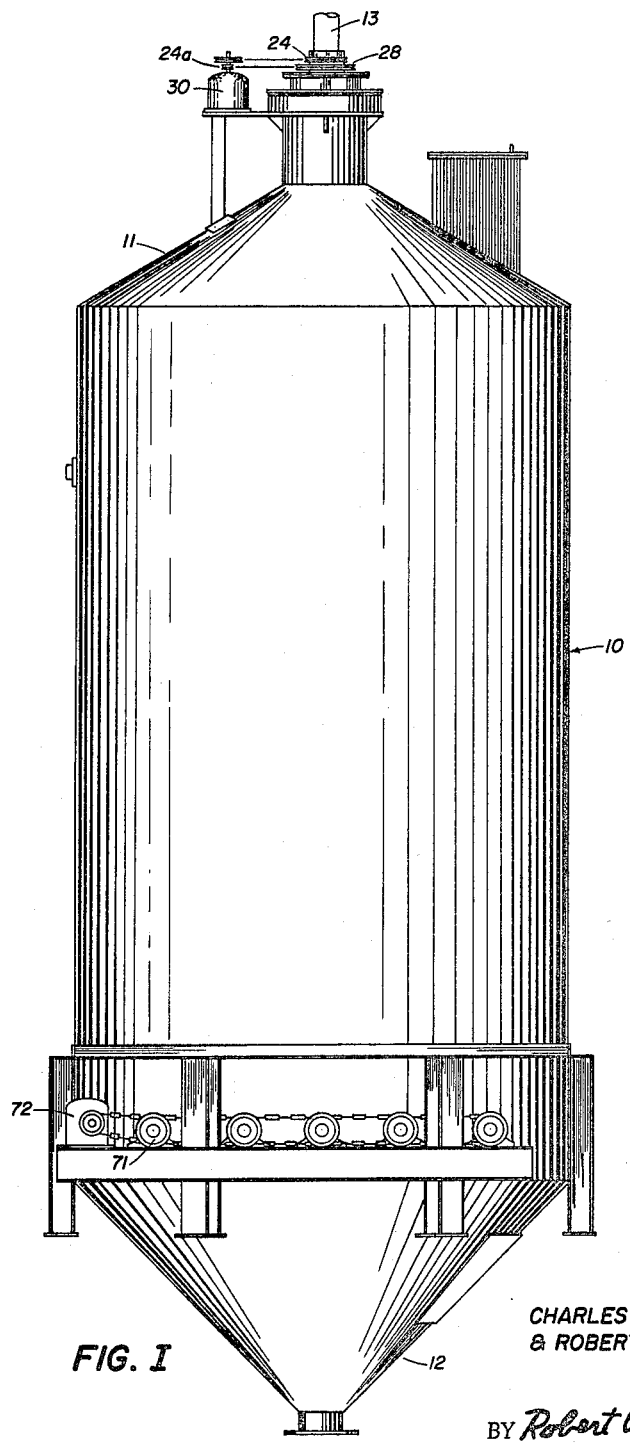
FIG. I
CHARLES ALTON LAWLER
& ROBERT CLYDE HOWELL
INVENTORS
BY Robert WB Dickerson
ATTORNEY

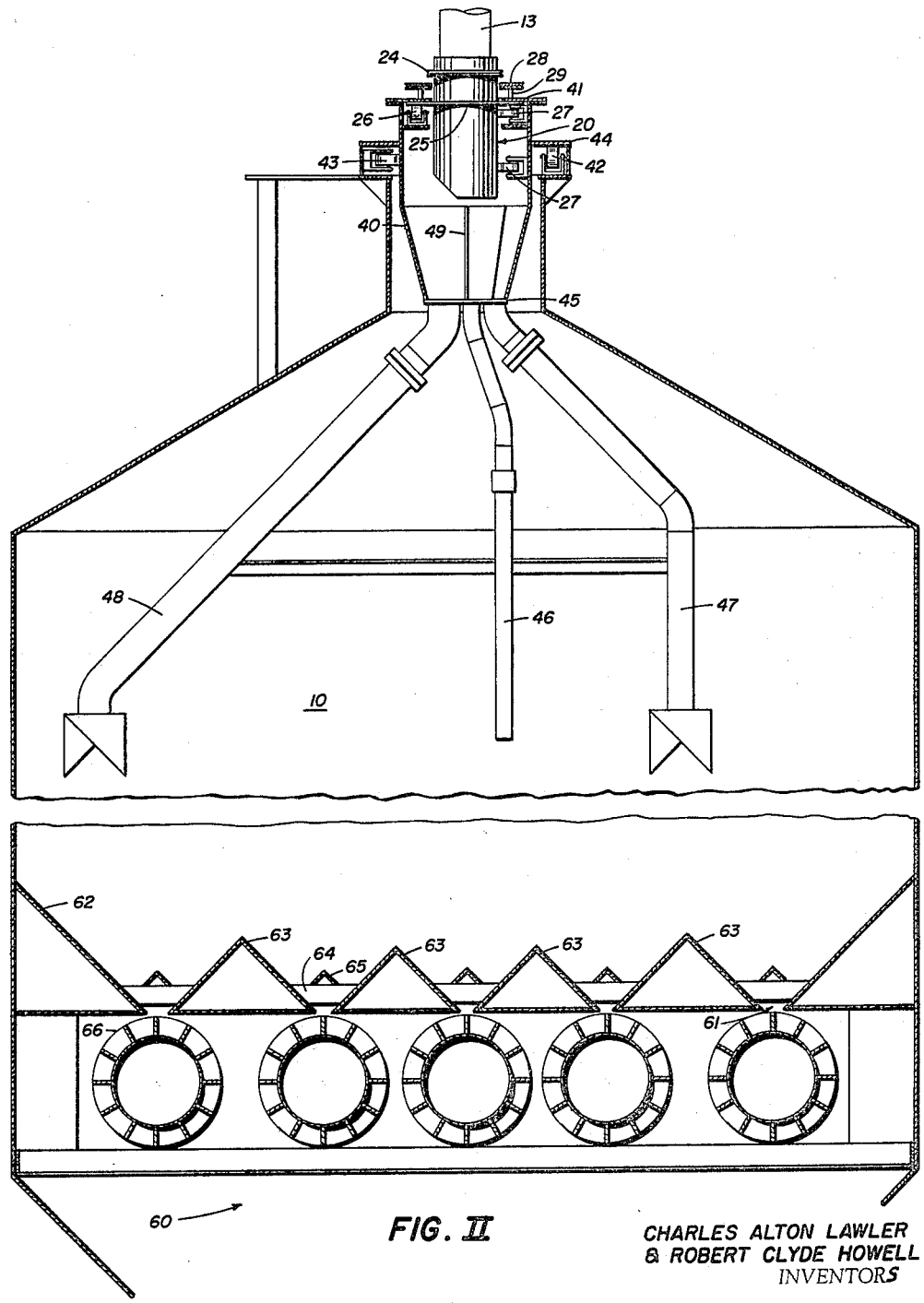

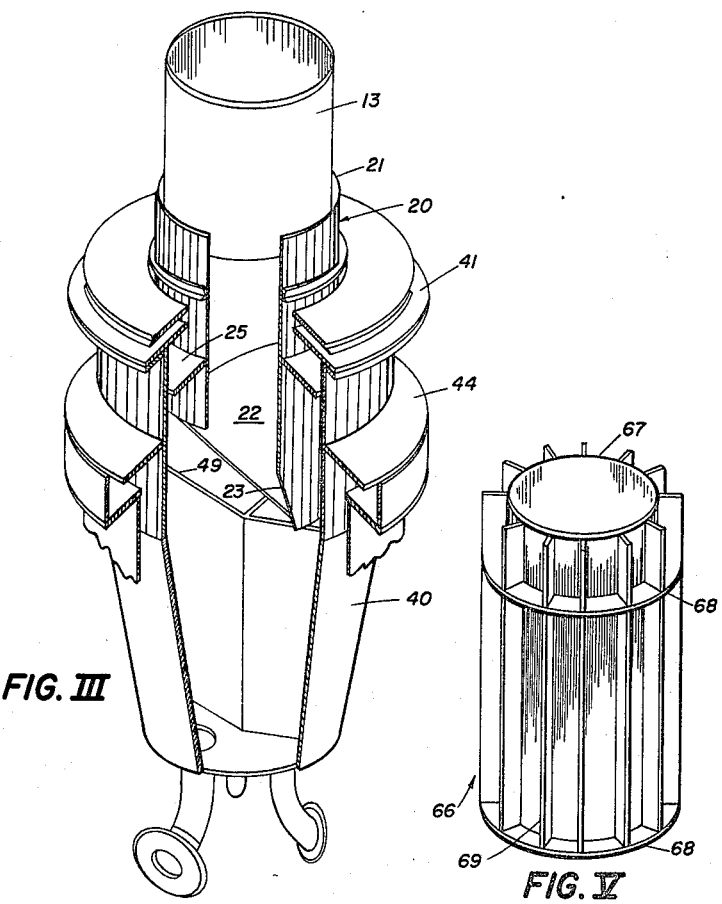
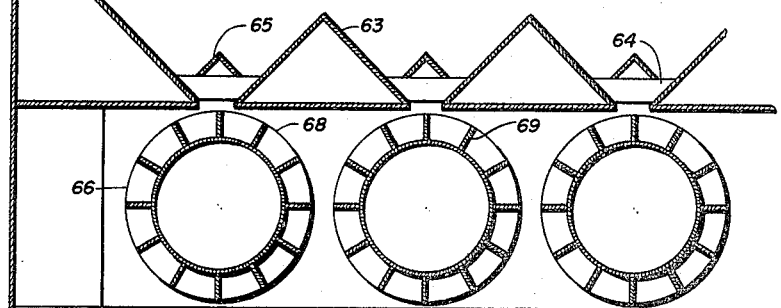

3,285,438
PARTICLE STORAGE BIN

Robert Clyde Howell and Charles Alton Lawler, Houston, Tex., assignors to Bovay Engineers, Inc., Houston, Tex., a corporation of Texas
Filed Sept. 11, 1964, Ser. No. 395,751
8 Claims. (Cl. 214—17)

This invention concerns apparatus for achieving uniformity of distribution of solid particles, in the provision to and withdrawal from a storage bin, of said particles.

Problems involving particle segregation have presented a continuing problem whenever bulk granular materials have been placed in a storage bin or container, and then withdrawn therefrom. The problem concerns the tendency of the larger particles to become segregated from the "fines," with a resultant inconsistent mixture of the bin draw-off. The cause of such a problem lies mainly in the tendency of material, flowing into a bulk storage bin, to fall into a conical pile whose slope approximates the angle of repose of the flowing material. In order to counteract this tendency, efforts, including the device of this invention have been made to insure an even and level distribution of material without the above described piling effect with the resulting segregation of particles.

A companion problem has involved the drawing off, at the bin bottom, of a distributed mixture of the stored particles. This, in turn requires the draw-off to be taken from substantially the entire area of the bin bottom, rather than at one point.

This invention contemplates attacking these two problems. Therefore an object of this invention is the provision of a device whereby bulk solid particles may be provided evenly to the entire surface of a storage container.

A further object is the provision of a mechanism whereby the particle level within a storage bin may be built up so as to form a substantially level upper surface with little tendency of the particles contained therein to become segregated.

Still another object is the provision of a device whereby stored particles may be drawn off from a plurality of locations without any tendency of the particles to be crushed by the draw-off mechanism and whereby leakage or spillage of the material stored during inactivity of the draw-off mechanism is negated.

These and other objects will become obvious on examining the following description, claims and drawings in which:

FIGURE 1 is a frontal elevation of the storage bin including the drive mechanism for both upper rotating elements as well as that for the lower rolls;

FIGURE 2 is a partial vertical section of the device of FIGURE 1, showing only the internal aspects of the bin and eliminating the driving means;

FIGURE 3 is a perspective, partially broken away, of the spreader mechanism;

FIGURE 4 is an expanded view of the draw-off portion of FIGURE 2;

FIGURE 5 is a perspective of a portion of one of the rolls.

From an examination of FIGURES 1 and 2, this invention will be seen to include a generally cylindrical tank portion 10, both the upper and lower portions of which are generally conically tapered, as at 11 and 12 respectively. Solid particle material, such as bone charcoal is fed into the bin by means such as inlet spout 13. The bulk material may be transported thereto in any convenient manner, such as by conveyor. Spout 13 is seen to be insertable into the annular area defined by the upper perimeter 21 of the rotary separator generally illustrated at 20. The separator is also generally cylindrical in configuration, having its upper end open, and its lower end partially closed by inclined surface 22. The plane of surface 22 is angularly inclined with respect to a plane perpendicular to the axis of separator 20. Further, separator 20 is cut away, i.e. open, toward its lower end, as at 23, adjacent surface 22. Thus, material poured through spout 13 into separator 20 will carom off surface 22 through opening 23 toward the lower recesses of tank in a manner hereinafter described. Separator 20 is seen to be rotatable by virtue of V-belt assembly 24 driven by motor 30. Plate 25 is seen to be attached to and encircling separator 20 approximately centrally of member 20. When separator 20 is rotated by belt and pulley arrangement 24, the separator is vertically positioned by the plate passing over and being supported by wheel arrangement 26, and centered by vertically spaced wheel arrangements 27 rolling against the vertical side of separator 20 (see FIG. 2). Actually there are a purality of spaced wheel members 26 and 27, only one of each group being shown. Both of wheel assemblies 26 and 27 are shown to be attached to an interior portion of a spreader, generally indicated at 40. The spreader has at its top centrally perforated plate 41. Through tthe central opening in said plate passes the lower portion of separator 20. Spreader 40 is vertically and horizontally rotatably positioned by wheel assemblies 42 and 43 respectively. Both of these wheel assemblies have their base fixed to the superstructure of tank 10. The revolving wheel portion of assembly 42 will be seen to vertically position spreader 40 by movingly engaging the undersurface of plate 44 which plate is fixed to the exterior surface of spreader 40, while the wheel of assembly 43 rollingly engages the outer surface of spreader 40. Here again, there are a plurality of assemblies 42 and 43 spaced around the periphery of spreader 40. A flat plate 45 describes the lower end of the body of spreader 40, said plate having holes therein to accommodate spouts 46, 47 and 48. Above each of the spaced holes in plate 45, the interior of spreader 40 will be seen to be partitioned into separate areas by partitions or dividers. These dividers are so positioned, leading from the axis of spreader 40 to the exterior wall thereof, to define unequal areas, for a reason hereinfater explained. For example the area, from which leads spout 48, includes approximately 60% of the area of spreader 40 enclosed by the partions, 30% of the total area in the area evacuated by spout 47, with the remaining partitioned area served by spout 46, having 10% of the total partitioned area. A further belt and pulley arrangement 24a is shown to connect motor 30 to spreader 40, the pulley portion 28 encircled by a belt being secured to plate 41 by metal sections 29.

In actual operation of the particle spreading mechanism (separator and spreader combined) by virtue of the differently sized pulleys affixed to the axle extension of motor 30 and used to rotate separator 20 and spreader 40, the two revolving cylindrical bodies will rotate at different speeds, for example the separator at five r.p.m. and the spreader at one r.p.m. Bulk material will enter separator 20 through chute 13, be deflected outwardly by inclined wall 22, through opening 23, into one of the partitioned areas of spreader 40, through one of spouts 46, 47, 48 to be deposited on the floor or bed of tank 10. It is important to note that separator 20 and spreader 30 rotate at different speeds. While rotating spreaders are not new per se, see U.S. Patent Nos. 2,655,273 and 2,219,954, if the spreading operation is to be extensive, difficulties were encountered with respect to the dual problems of evenly depositing the particles within the storage bin and preventing overflow of the spreader. For example, if only the spreader were rotatable, and the particles were caused to enter one of the partitioned areas only one time during each revolution, then unless the inflow were precisely measurable (a near impossibility) then either the particles would be evacuated onto the bin floor at the same point each revolution, leaving barren points, or the partition would overflow, assuming a continuous supply. In this device, the particles provided to each partitioned area are designed to be evacuated prior to separator 20 providing additional particles. Thus, since separator 20 makes a plurality of revolutions during each of spreader 40, the chutes leading from spreader 40 will deposit particles on the bin bed in the form of a large number of relatively small deposits, periodically covering the entire area swept by the respective chutes and assuring an even build-up of and relatively flat upper surface of the bed of the material. It is further noted that the area enclosed by the partitioned areas of spreader 40 are proportional to the area of the bed of the storage bin swept by the respective chutes 46, 47, 48 associated with the partitioned areas. For example, since chute 46 is positioned closer to the axis of vessel 10 than is chute 48, the area swept by chute 46 will be substantially less than that by chute 48.

Moving now to the lower portion of tank portion 10, the draw-off portion, generally indicated at 60, is hereinafter described, see especially FIGURES 2, 4 and 5. A plurality of spaced parallel slots 61 are defined by wall beams 62 and prismatic beams 63. Perpendicular to beams 63 are support beams 64, a plurality of which connect prismatic beams 63 to wall beams 62 and thereby to the superstructure of vessel 10. These cross beams also serve to fix and position deflector bars 65 positioned, in each case above one of the respective slots 61. Immediately below each of slots 61 is a fluted roll 66. FIGURE 5 shows each of these rolls to include a central core member 67. Affixed thereto at spaced intervals are support plates 68, and perpendicular to said plates 68 and supported thereby, are fin portions 69 extending along the length of roll 66. Since all of the rolls 66 rotatably fixed to the superstructure of vessel 10, as at 71, and caused to rotate by motor 72, using a belt drive, the operation of the draw-off is made clear. The bulk particles have first been evenly distributed within the interior of tank or vessel 10. In withdrawing the particles from the vessel, it is essential that a uniform mixture of particle sizes be taken. Thus, the particles are deflected by deflectors 64 and prismatic beams 63, to pass through slot 61. When no draw-off is being effected, rolls 66, by virtue of fins 69 prevent downward movement of the particles. On the rolls 66 being caused to rotate, particles will be caused to pass downwardly into hopper portion 12 to eventually pass out through the lower funnel exit of tank 10. It is seen that evacuation occurs at a number of locations at the vessel bottom, herein accomplishing a representative sampling of the particle bed. Further deflector and prismatic beams 65, 63 prevent particle separation prior to evacuation. It is not claimed that roller evacuation by a number of rotatable rollers is new as such, see U.S. Patent No. 3,056,484, but that the particular positioning of the rollers of this device solve a further problem, namely that of crushing particles if the particles are trapped between the roller fin and any adjacent metal. Note that here the rollers lie below the slots formed by the respective beams. Not only is leakage of particles prevented when the rollers are stationary, but importantly, there is no metal to metal contact between the roller and the flow assisting beams. Thus there is no crushing of particles which would normally result in a large quantity of "fines" or powder.

In the explanation of the structure of this device it is believed that the operation of the device has been thoroughly explained. While the invention has been discussed with relation to only a single embodiment thereof, it should be obvious that numerous modifications would be possible by one skilled in the art and yet lie within the spirit of the invention, the scope of which should be limited by only the following appended claims.

We claim:
1. A particle storage bin comprising:
   a central non compartmented storage vessel;
   means for providing solid particles in bulk to the interior of said storage vessel;
   a plurality of spaced draw-off areas in the lower portion of said storage vessel;
   spaced prismatic beam means intermediate each of said areas for directing the flow of said particles toward spaced deflector beams above each of said draw-off areas;
   and roller means for drawing off said particles positioned adjacent to and below each of said draw-off areas.

2. The combination of claim 1 wherein:
   each of said means for drawing off said particles includes a motor driven roller having a plurality of fin portions affixed thereto; and
   each of said rollers is so positioned relaitve to one of said draw-off areas as to effectively block passage of said particles through said draw-off areas when said rollers are not being rotated by said motor.

3. A particle storage bin comprising:
   a central storage vessel;
   an upper rotatable portion for receiving said particles;
   a lower rotatable portion for receiving said particles from said upper rotatable portion;
   means affixed to said lower rotatable portion for uniformly distributing said particles within the interior of said storage vessel;
   means for drawing off said particles from the lower portion of said storage vessel;
   means for causing said upper and lower rotatable elements to rotate at different speeds; and
   said means affixed to said lower rotatable portion includes a plurality of chutes each of which, during rotating, describes an arc having a perimeter of a different size from the perimeter described by any of the other chutes.
   of the other chutes said lower rotatable portion being compartmented into a plurality of areas, each of which is proportional in size to the arc perimeter described by an associated one of said chutes.

4. A particle storage bin comprising:
   a central storage vessel;
   an upper rotatable portion for receiving said particles:
   a lower rotatable portion for receiving said particles from said upper rotatable portion;
   means affixed to said lower rotatable portion for uniformly distributing said particles within the interior of said storage vessel;
   means for drawing off said particles from the lower portion of said storage vessel;
   the interior of said lower rotatable portion is partitioned into a plurality of differently sized areas;
   means for causing said upper and lower rotatable elements to rotate; and
   the area within each of said partitioned areas is proportional to the area described by one of said means for distributing said particles.

5. A particle storage bin comprising:
   a central storage vessel;
   an upper rotatable portion for receiving said particles;
   a lower rotatable portion for receiving said particles from said upper rotatable portion;
   means affixed to said lower rotatable portion for uniformly distributing said particles within the interior of said storage vessel;
   means for drawing off said particles from the lower portion of said storage vessel;
   said upper rotatable portion has an inclined surface to cause said particles impinging thereon to carom outwardly and downwardly into said lower rotatable portion;

said lower rotatable portion is concentric with said upper rotatable means; and means for causing said upper and lower rotatable means to rotate at different speeds.

6. In a particle storage and evacuation bin, the combination of;

a central storage vessel;

an upper rotatable portion for receiving said particles, said portion having an inclined surface to cause said particles impinging thereon to carom outwardly and downwardly into a lower rotatable portion;

a lower rotatable portion concentric with said upper rotatable portion, the interior of said lower rotatable portion being partitioned into a plurality of spaced areas;

a plurality of particle distributing chutes, one of which is affixed to each of said partitioned areas of said lower rotatable portion for providing said particles to the interior of said storage vessel, the area within each of said partitioned areas being proportional to the length of the perimeter described by the associated chute as said chute is rotated;

means for causing said upper and lower rotatable portions to rotate at different speeds;

a plurality of spaced draw-off areas in the lower portion of said storage vessel;

spaced means for directing the flow of said particles toward said draw-off areas; and roller means for drawing off said particles positioned adjacent to and below each of said draw-off areas, each of said roller means being motor driven and having a plurality of fin portions affixed thereto as well as being so positioned relative to one of said draw-off areas as to effectively block passage of said particles through said draw-off areas when said rollers are not being rotated by said motor.

7. A particle storage bin comprising:

a central storage vessel;

means including an upper rotatable portion having an inclined surface for deflecting said particles outwardly into a lower rotatable portion and a lower rotatable portion for receiving said particles and providing them to and uniformly distributing them within the interior of said storage vessel;

a plurality of spaced draw-off areas in the lower portion of said storage vessel;

spaced prismatic beam means intermediate each of said areas for directing the flow of said particles toward said draw areas; and spaced deflector beams above each of said draw-off areas; and roller means for drawing off said particles positioned adjacent to and below each of said draw-off areas.

8. A particle storage bin comprising:

a central storage vessel;

spreader means including an upper motor driven rotatable portion for receiving said particles and directing them into a lower rotatable portion, a lower concentric portion rotatable at a different speed from said upper portion, said lower portion being compartmented into a plurality of areas for receiving said particles and distributing them, through associated chute means, to said vessel's interior, said upper portion being caused to rotate at such a speed as to provide no particles to any one of said partitioned areas until particles previously provided thereto have evacuated;

means for directing particles received within said vessel's interior toward one of a plurality of draw-off areas; and motor driven roller means positioned below each of said draw-off areas for both drawing off said particles when said roller means are rotated and barring the passage of said particles through said draw-off areas when said roller are not being rotated.

References Cited by the Examiner

UNITED STATES PATENTS

| 3,064,833 | 11/1962 | Von Ruden | 214—17 |
| 3,077,274 | 2/1963 | Kitzrow | 214—35 |
| 3,103,287 | 9/1963 | Weinecke et al | 214—17 |
| 3,118,575 | 1/1964 | McCauley | 222—564X |

FOREIGN PATENTS 234,738  1/1925  Great Britain.

GERALD M. FORLENZA, *Primary Examiner.*

R. G. SHERIDAN, *Assistant Examiner.*